3,542,781
7-ALKYLAMINO 7-HYDROXY QUINOLINE 3-CARBOXYLATES

Arthur A. Patchett, Cranford, Robert L. Clark, Woodbridge, and Edward F. Rogers, Middletown, N.J., assignors to Merck & Co., Inc., Rahway, N.J., a corporation of New Jersey
No Drawing. Continuation-in-part of application Ser. No. 540,495, Apr. 6, 1966. This application Dec. 23, 1968, Ser. No. 786,454
The portion of the term of the patent subsequent to Apr. 9, 1985, has been disclaimed
Int. Cl. C07d 33/48
U.S. Cl. 260—287          9 Claims

---

ABSTRACT OF THE DISCLOSURE

Novel 4-hydroxy-quinoline-3-carboxylates having a haloalkoxy, alkoxy, or alkyl at the 6-position and a substituted amino radical at the 7-position are prepared by condensing an appropriate 3,4-disubstituted aniline with a loweralkyl alkoxymethylene malonate, and heating the resulting anil. These novel quinolates have anticoccidial activity.

---

This application is a continuation-in-part of our copending application U.S. Ser. No. 540,495 filed Apr. 6, 1966, now U.S. 3,449,403 granted Jan. 10, 1969.

This invention relates to new chemical compounds. More specifically, it relates to novel quinoline-3-carboxylates useful in combatting the poultry disease coccidiosis. Still more specifically, it is directed to loweralkyl-6-substituted-7-substituted amino 4-hydroxy-quinoline-3-carboxylates, intermediates thereof and their method of preparation. It is also concerned with the use of the carboxylates as coccidiostats and novel anticoccidial compositions containing them.

Coccidiosis is a widespread poultry disease involving the invasion of caecal and intestinal mucosa by coccidia, specifically protozoan parasites of the genus Eimeria. The most important of these species are $E.\ maxima$, $E.\ acervulina$, $E.\ tenella$, $E.\ necatrix$, $E.\ brunetti$, $E.\ praecox$ and $E.\ mitis$. When left untreated, the severe form of the disease leads to poor weight gain, reduced feed efficiency, reduced egg production and high mortality. For these reasons, the control of coccidiosis is highly important to the poultry industry.

According to the present invention, it has been found that certain 7-substituted amino-4-hydroxy-quinoline-3-carboxylates are highly effective in the treatment and prevention of coccidiosis. An object of this invention, therefore, is to provide new chemical compounds useful in the control of coccidiosis. A further object is to provide novel compounds useful as intermediates in preparing the coccidiostats. Another object is to provide novel compositions containing the active compounds. A still further object is provision of methods of making such compounds and compositions. An additional object is provision of methods of combatting coccidiosis by administering to poultry minor amounts of the anticoccidial substances described herein. Further objects will become evident from the following discussion of the invention.

In accordance with the present invention, it has now been found that compounds represented by the structural Formula I possess significant anticoccidial activity.

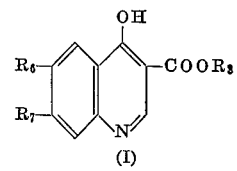

(I)

where $R_3$ is loweralkyl, $R_6$ is haloalkoxy having 2–4 carbon atoms, alkoxy, and alkyl, and $R_7$ is a substituted amino group.

The substituent $R_3$ in the above formula represents methyl, ethyl, butyl, isobutyl and the like. $R_6$ represents an alkyl group having 2–18 carbon atoms, such as the loweralkyl groups mentioned above in defining $R_3$, as well as higher alkyl, such as pentyl, hexyl, heptyl, octyl, nonyl, decyl, hendecyl, dodecyl, octadecyl and the like, or cycloalkyl, such as cyclohexyl and the like, and a haloalkoxy group having 2–4 carbon atoms, such as haloethoxy, halopropoxy, halobutoxy and the like. This haloalkoxy substituent may contain halogen groups such as chloro, bromo, fluoro, and iodo. Moreover, the haloalkoxy group at the 6-position may contain halogen moieties which may be the same or different. Preferably, such haloalkoxy group also has two fluoro groups on the alpha carbon and at least one hydrogen on the beta carbon. It is also preferred that these compounds contain in this haloalkoxy group no more than one halogen other than fluorine. Alkoxy groups, having 2–18 carbon atoms, are also represented by the symbol $R_6$. Such substituent may therefore be a methoxy, ethoxy, propoxy, isopropoxy, butoxy, isobutosy, pentoxy, hexyloxy, nonyloxy, decyloxy, or octadecyloxy group, and the like.

A significant feature of the anticoccidial compounds of this invention is the substituent at the 7-position ($R_7$) of the quinoline carboxylates defined by Formula I above.

$R_7$ represents a substituted amino group which may be depicted by the formula $NR_1R_2$. The symbols $R_1$ and $R_2$ represent alkyl, preferably loweralkyl such as methyl, ethyl, propyl, isopropyl, and the like, aryl, such as phenyl and the like, aralkyl, such as benzyl and substituted benzyl and the like, and loweralkenyl, such as allyl and the like. $NR_1R_2$ also represents cyclic amino groups such as morpholino, piperidino, pyrollidino, and the like.

As illustrative of the compounds of this invention there may be mentioned methyl 4-hydroxy-6-($\alpha,\alpha,\beta,\gamma,\gamma,\gamma$ - hexafluoropropyloxy)- 7-dimethylamino-quinoline-3-carboxylate,
ethyl 4-hydroxy-6-($\alpha,\alpha$-difluoro-$\beta$-chloroethoxy)-7-morpholino-quinoline-3-carboxylate,
methyl 4-hydroxy-6-isopropyl-7-diethylamino-quinoline-3-carboxylate,
ethyl 4-hydroxy-6-($\alpha,\alpha,\beta$-trifluoro-$\beta$-chloroethoxy)-7-diethylamino-quinoline-3-carboxylate,
methyl 4-hydroxy-6-ethyl-7-diethylamino-quinoline-3-carboxylate,
ethyl 4-hydroxy-6-n-propyl-7-diphenylamino-quinoline-3-carboxylate,
methyl 4-hydroxy-6-($\alpha,\alpha,\beta$-trifluoro-$\beta$-iodoethoxy)-7-diisopropylamino-quinoline-3-carboxylate,
methyl 4-hydroxy-6-methyl-7-diethylamino-quinoline-3-carboxylate, methyl 4-hydroxy-6-isopropoxy-7-dimethylamino-
quinoline-3-carboxylate,
methyl 4-hydroxy-6-n-propoxy-7-diethylamino-
quinoline-3-carboxylate, and
methyl 4-hydroxy-6-n-propoxy-7-di-n-propylamino-
quinoline-3-carboxylate,
methyl 4-hydroxy-6-n-propyl-7-dimethylamino-
quinoline-3-carboxylate,
methyl 4-hydroxy-6-n-propoxy-7-diethylamino-
quinoline-3-carboxylate,
ethyl 4-hydroxy-6-isopropoxy-7-dimethylamino-
quinoline-3-carboxylate,
methyl 6-decyloxy-7-diethylamino-4-hydroxy-
quinoline-3-carboxylate,
methyl 4-hydroxy-6-decyloxy-7-diethylamino-
quinoline-3-carboxylate,
methyl 4-hydroxy-6-octadecyl-7-diethylamino-
quinoline-3-carboxylate, and
methyl 4-hydroxy-6-cyclohexyl-7-diethylamine-
quinoline-3-carboxylate.

The quinoline-3-carboxylates defined by Formula I above are prepared by treating a 3-substituted amino-4-substituted aniline with a loweralkyl loweralkoxy methylene malonate and heating the intermediate obtained thereby.

This reaction may be represented as follows:

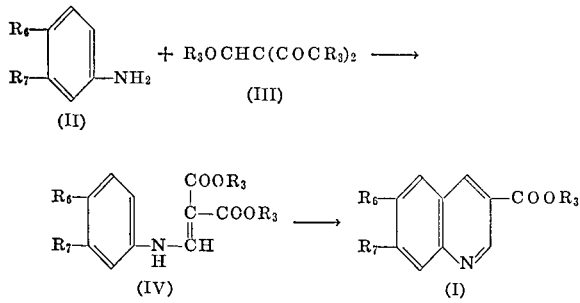

where $R_3$, $R_6$, and $R_7$ are as earlier defined.

In the first step of the above synthesis, a substituted aniline of Formula II above is treated with a diloweralkyl loweralkoxy methylene malonate of Formula III in solvent. Solvents such as alcohols, e.g. loweralkanols such as ethanol and isopropanol, ethers such as diethylether, dioxane, diethylene glycol, dimethylether, ethylene glycol dimethylether, and the like are useful in this regard. The reactants are preferably present in a molar ratio of 1:1 but this may vary somewhat without substantial adverse effect on the quantity of acrylate (IV) to be obtained. This reaction may be carried out at 40°–120° C. but temperatures in the range of 80°–100° C. are preferred.

The acrylate may then be converted to the quinoline-3-carboxylate by treatment with heat. Temperatures of from 200° C.–300° C. are satisfactory with 240°–260° C. being preferred. Although not essential to the success of this process, it is preferred that a solvent be employed to better satisfy heat transfer requirements and to improve the yield of product. Solvents which might be used in this regard include dimethylsulfone, dodecylbenzene, biphenyl, diphenylether, and other similar high-boiling solvents.

In accordance with another aspect of the invention, the novel quinoline-3-carboxylates described according to Formula I above are prepared by esterifying the corresponding quinoline-3-carboxylic acid. This provides an additional method for preparing the novel carboxylates which is at times more readily performed than that earlier described. This process is effected by treating the acid with a strong concentrated mineral acid such as phosphoric acid, hydrochloric acid, sulphuric acid, and the like, and an appropriate loweralkanol. The temperature should be maintained at about 75°–150° C., conveniently at about 100° C. for several hours. The remaining alkanol may be removed in vacuo and the residue is worked up by conventional techniques such as neutralization, solution and crystallization.

According to still another method of the present invention, the compounds of Formula I are preparable from the corresponding quinoline-3-carboxylic acid halide. The acid halide is treated with a loweralkanol, e.g. methanol, at 40°–160° C. The reaction mixture may then be filtered. The carboxylate product is obtained by cooling the filtrate. Solution, recrystallization, charcoal treatment, and the like may be used in purification of this material.

In accordance with an additional aspect of this invention, there are prepared 7-substituted amino 4-hydroxy-quinolines of the formula

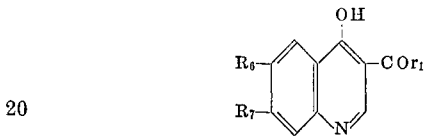

where $R_1$ represents hydroxy and halo and $R_6$ and $R_7$ are as earlier defined. The quinoline-3-carboxylic acids are obtainable from the compounds of Formula I by heating the latter with dilute sodium hydroxide and adding the resulting mixture to mineral acid in alcohol, e.g. hydrochloric acid in methanol. The acid chloride is derived from the acid by, for example, treatment with thionyl chloride at about 80° C.

The 3-substituted amino 4-substituted aniline starting materials of this invention are prepared according to known methods. For example, an aniline starting material having a diloweralkyl or diloweralkenyl amino group at the 3-position and an alkoxy, alkyl or haloloweralkoxy group at the 4-position is prepared from an orthonitrophenol by treating said phenol with an alkylating agent such as the appropriate alkene-1, to obtain the orthoalkoxy nitrobenzene or orthohaloalkoxy nitrobenzene, preferably at 60° or 150° C., at a pressure preferably of 2 atmospheric gauge. This compound is then reduced to the corresponding aniline by treatment by hydrogenation with palladium as catalyst. This ortho-substituted aniline is then arylated, alkylated or alkenylated with triaryl, triaralkyl, trialkyl or trialkenyl phosphate. The resulting orthohaloalkoxy or orthoalkoxy-substituted-amine is then nitrated with sulfuric and nitric acid, and the resulting disubstituted nitrobenzene is converted to the aniline starting materials by hydrogenation using palladium as catalyst. Many of the haloalkene reactants are commercially available. Others may be prepared by standard methods known in the art, such as that described in the book Chemistry of Organic Fluorine Compounds by Milos Hudlicky (MacMillan & Co., 1962) on pages 128–133. The starting materials having as the substituted-amino group a cyclic amino moiety may be prepared from the corresponding ortho-cyclicaminophenol, which are known compounds. A procedure similar to that utilized above in preparation of the di-loweralkyl and di-loweralkenyl amino compounds may be used including alkylation of the hydroxy moiety and nitration of the di-substituted benzene. The aniline starting materials having an alkoxy group at the 4-position are prepared from the corresponding ortho-substituted aminophenol by converting the phenol to its sodium salt and alkylating the resulting salt with the appropriate alkyl halide, e.g. an alkyl bromide.

According to the present invention, it has been found that the compounds of Formula I above are highly effective for the treatment or prevention of coccidiosis. For this purpose, they are administered to poultry as a component of the feed or drinking water.

Although every carboxylate within the purview of this invention does not have the same degree of anticoccidial efficacy, all are active. The amount of active agent necessary for adequate control of the disease will vary with the severity of infection, the duration of treatment and, as indicated above, the particular compound employed as the coccidiostat.

It is one aspect of this invention to provide novel compositions in which the compounds defined by Formula I are present as the active anticoccidial ingredient. Such compositions comprise the quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water soluble powders, aqueous suspensions, or solutions.

The compositions which are one of the preferred features of the invention are feed supplements in which the active anticoccidial ingredient is present in relatively large amounts in a poultry feed additive. Diluents which are normally employed for these animal feed supplements are solid orally ingestible poultry feed additives such as distillers' dried grains, corn meal, citrus meal, crushed limestone, and the like. The diluents preferred have nutritive value to the poultry and are normal ingredients of the finished feed. These supplements are incorporated in the poultry feed either directly or in an intermediate dilution or blending step. These premixes or feed supplements may contain about 5–50% by weight of the active ingredient.

Examples of typical feed supplements containing a quinoline-3-carboxylate of this invention are as follows:

(A)

Methyl 4-hydroxy-6-($\beta$-chloro-$\alpha,\alpha,\beta$-trifluoroethoxy)-7-diethylamino-quinoline-3-carboxylate _____ 10
Corn meal _____ 90

(B)

Ethyl 4-hydroxy-6-(n-propyl)-7-diethylamino-quinoline-3-carboxylate _____ 8
Distillers' dried grains _____ 92

Finished feeds may be a mash containing ground grain, animal and vegetable proteins, mineral and vitamin concentrates, or it may be a broiler feed containing a large proportion of ground yellow corn together with other nutritive substances such as fish meal, soybean oil meal, meat products, minerals and vitamins. Feed levels of drug of from about 0.0005% to about 0.05% by weight are effective in controlling coccidiosis, with concentrations of about 0.0025% to 0.025% by weight of feed being preferred. It should be understood that high feed levels within these ranges may be employed when using the compounds therapeutically for relatively short periods of time whereas lower feed levels are useful when the compounds are used prophylactically. It is desirable to employ the lowest levels that afford adequate control of the disease to minimize risk of side effects that might appear on prolonged feeding of the compounds. When the active agents are administered by way of the drinking water, somewhat lower levels than those in feed will be satisfactory since the birds drink about twice as much as they eat. The use of the active agent in drinking water is made more practically useful by addition to the water of a suspending agent such as acacia, tragacanth, Veegum (colloidal magnesium-aluminum silicate, R. E. Vanderbilt Co.), carboxypolymethylene, algins, methylcellulose, hydroxyethylates cellulose and others, which promotes even distribution of the water-insoluble material.

One or more of the quinoline-3-carboxyles defined by Formula I may be used as the sole active agent or it may be used in conjunction with other coccidiostats. Such mixtures may be used for the purpose of utilizing the primary effectiveness of each compound against a particular species of coccidia. It has now been found that the present compounds are highly effective against *E. brunetti* and *E. tenella*. See Table I for specific activities of the compounds. For the purpose of producing a broad spectrum coccidiostat composition, these 4-hydroxyquinoline-3-carboxylates may accordingly be admixed with a compound highly efficacious in treating another variety of the disease.

The following examples are given for the purpose of illustration and not by way of limitation.

TABLE I.—COCCIDIOSIS ACTIVITY

Compound $$\text{structure with OH, R}_6, R_7, \text{COOR}_3, N$$

| | | | Minimum effective dose level, percent by weight in feed | |
|---|---|---|---|---|
| $R_3$ | $R_6$ | $R_7$ | *E. brunetti* | *E. tenella* |
| $CH_3$ | decyloxy | $N(C_2H_5)_2$ | 0.0008 | 0.004 |
| $CH_3$ | $N(C_2H_5)_2$ | $n\text{-}C_3H_7O$ | 0.0015 | 0.0015 |
| $CH_3$ | cyclohexyl | $N(C_2H_5)_2$ | 0.0008 | 0.0015 |
| $CH_3$ | decyl | $N(C_2H_5)_2$ | 0.0015 | 0.0015 |
| $C_2H_5$ | decyl | $N(C_2H_5)_2$ | 0.003 | 0.006 |
| $CH_3$ | $N(C_2H_5)_2$ | decyloxy | 0.0015 | 0.006 |

EXAMPLE 1

Methyl 4-hydroxy-6-($\alpha,\alpha,\beta$-trifluoro-$\beta$-chloroethoxy)-7-dimethylamino-quinoline-3-carboxylate 2 grams of 3-diethylamino-4-($\alpha,\alpha,\beta$-trifluoro-$\beta$-chloroethoxy)-aniline is added to 1.6 g. of dimethylmethoxy methylene malonate and the solution is heated on the steam bath until the solvent is evaporated. The residue, methyl-$\alpha$-carbmethoxy-$\beta$-[3 - dimethylamino - 4 - ($\alpha,\alpha,\beta$-trifluoro-$\beta$-chloroethoxy)-anilino]-acrylate, is added to 100 ml. of dodecyl benzene with stirring at 250° C. After one-half hour, the mixture is cooled and the solid filtered off. The solid is added to hot acetone and crystallized therefrom to provide methyl 4-hydroxy-6-($\alpha,\alpha,\beta$-trifluoro-$\beta$ - chloroethoxy)-8-diethylamino-quinoline-3-carboxylate; M.P. 258°–260° C.

Ethyl 4 - hydroxy - 6 - ($\alpha,\alpha,\beta$ - trifluoro - $\beta$ - chloroethoxy) - 7 - diethylamino-quinoline-3-carboxylate (M.P. 239°–242° C.) is prepared using the above procedure when diethylethoxy methylene malonate is used in place of dimethylmethoxy methylene malonate.

When the above process is carried out and 3-morpholino - 4 - ($\alpha,\alpha,\beta$-trifluoro-$\beta$-chloroethoxy)-aniline, 3-piperidino - 4 - ($\alpha,\alpha,\beta$-trifluoro-$\beta$-chloroethoxy) - aniline, or 3-pyrollidino - 4 - ($\alpha,\alpha,\beta$-trifluoro-$\beta$-chloroethoxy) - aniline is used in place of 3-dimethylamino-4-($\alpha,\alpha,\beta$-trifluoro-$\beta$-chloroethoxy)-aniline, there is obtained methyl 4-hydroxy-6 - ($\alpha,\alpha,\beta$ - trifluoro - $\beta$ - chloroethoxy) - 7 - morpholinoquinoline-3-carboxylate (M.P. 278°–283° C.; ethyl ester, 276°–284° C.), methyl 4 - hydroxy-6-($\alpha,\alpha,\beta$-trifluoro-$\beta$-chloroethoxy) - 7 - piperidino - quinoline-3-carboxylate (M.P. 275°–285° C.; ethyl ester, 261°–270 ° C.), or methyl 4 - hydroxy - 6 - ($\alpha,\alpha,\beta$-trifluoro-$\beta$-chloroethoxy)-7 - pyrollidino - quinoline-3-carboxylate (M.P. 286°–390° C.; ethyl ester, 285°–290° C.), respectively.

EXAMPLE 2

Methyl 4-hydroxy-6-($\alpha,\alpha,\beta$-trifluoro-$\beta$-chloroethoxy)-7-dimethylamino-quinoline-3-carboxylate To 2.2 g. of dimethylmethoxy methylene malonate is added 3.2 grams of 3-dimethylamino-4-($\alpha,\alpha,\beta$-trifluoro-$\beta$-chloroethoxy)-aniline in 50 ml. of methanol. The mixture is heated on a steam bath for three hours. The solvent is removed in vacuo leaving methyl $\alpha$-carbmethoxy-$\beta$ - [3-dimethylamino - 4($\alpha,\alpha,\beta$-trifluoro-$\beta$-chloroethxy)-anilino]-acrylate. This product is added to 45 ml. of dodecyl benzene at 250° C. and the mixture is maintained at this temperature for one half hour. The mixture is allowed to cool to room temperature and the product, methyl 4 - hydroxy-6-($\alpha,\alpha,\beta$-trifluoro-$\beta$-chloroethoxy)-7-dimethylamino-quinoline-3-carboxylate, is obtained; M.P. 287°–288° C.

When the above process is carried out and diethylethoxy methylene malonate is used in place of dimethylmethoxy methylene malonate, ethyl 4-hydroxy-6-($\alpha,\alpha,\beta$-trifluoro - $\beta$-chloroethoxy) - 7 - dimethylamino-quinoline-3-carboxylate is obtained; M.P. 275°–278° C.

When the above process is carried out and 3-dipropylamino-4-($\alpha,\alpha,\beta$-trifluoro - $\beta$ - chloroethoxy)-aniline, 3-dimethylamino-4-($\alpha,\alpha$ - difluoro - $\beta$ - chloroethoxy)-aniline, 3-diethylamino - 4 - ($\alpha,\alpha,\gamma,\gamma,\gamma$ - pentafluoropropoxy)-aniline, or 3-morpholino-4-($\alpha,\alpha,\beta$-trifluoro - $\beta$ - iodoethoxy)-aniline is used in place of 3-dimethylamino-4-($\alpha,\alpha,\beta$-trifluoro-$\beta$-chloroethoxy)-aniline, there is obtained methyl 4-hydroxy-6 - ($\alpha,\alpha,\beta$-trifluoro - $\beta$ - chloroethoxy)-7-dipropylamino-quinoline-3-carboxylate (M.P. 215°–225° C.; ethyl ester, 205°–207° C.); methyl 4-hydroxy-6-($\alpha,\alpha$-difluoro-$\beta$-chloroethoxy) - 7 - dimethylamino-quinoline-3-carboxylate; methyl 4 - hydroxy-6-($\alpha,\alpha,\gamma,\gamma,\gamma$-pentafluoropropoxy)-7-diethylamino-quinoline - 3 - carboxylate; or methyl 4 - hydroxy - 6 - ($\alpha,\alpha,\beta$-trifluoro-$\beta$-iodoethoxy)-7-morpholino-quinoline-3-carboxylate, respectively.

EXAMPLE 3

Methyl 4-hydroxy-6-isopropoxy-7-dimethylamino-3-quinoline-carboxylate

To a solution of 3-dimethylamino-4-isopropoxyaniline in 75 ml. methanol is added 11 g. of dimethylmethoxy methylene malonate. The solvents are removed and the residue heated on the steam bath for one hour to give methyl $\alpha$-carbmethoxy - $\beta$ - (3-dimethylamino - 4 - isopropoxyanilino)-acrylate. This oil residue containing the acrylate is added to 175 ml. of dodecyl benzene, heated to 250° C. and after 20 minutes the mixture is cooled and the separated material, methyl 4-hydroxy - 6 - isopropoxy-7-dimethylamino-3-quinoline-carboxylate, is crystallized from dimethyl formamide-ether (1:1), M.P. 244°–246° C.

When the above process is carried out and 3-diethylamino-4-n-propyl-aniline, 3 - dimethylamino-4-isobutoxy-aniline, 3-diethylamino-4-isopropoxy-aniline, or 3-dipropylamino-4-isobutoyl-aniline is used in the above process in place of 3-dimethylamino-4-isopropoxy-aniline, there is obtained methyl 4-hydroxy-6-n-propyl - 7 - diethylamino-quinoline-3-carboxylate (M.P. 195°–200° C.; ethyl ester, 204°–206° C.); methyl 4-hydroxy-6-isobutoxy-7-dimethylamino-quinoline-3-carboxylate (M.P. 246°–247° C.); methyl 4-hydroxy-6-isopropoxy-7-diethylamino-quinoline-3-carboxylate, or methyl 4-hydroxy-6-isobutyl-7-dipropylamino-quinoline-3-carboxylate, respectively.

When the above process is carried out and 3-dibenzylamino-4-isopropoxy-aniline, 3-diallylamino-4-isopropoxy-aniline, or 3-diphenylamino-4-isopropoxy-aniline is used in place of 3-dimethylamino-4-isopropoxy-aniline, methyl 4 - hydroxy-6-isopropoxy - 7 - dibenzylamino-quinoline-3-carboxylate, methyl 4-hydroxy - 6 - isopropoxy-7-diallylamino-quinoline-3-carboxylate, or methyl 4-hydroxy-6-isopropoxy-7-diphenylamino - quinoline-3-carboxylate respectively, are obtained.

EXAMPLE 4

Ethyl 4-hydroxy-6-isopropoxy-7-dimethylamino-quinoline-3-carboxylate

To a suspension of 0.6 g. of 4-hydroxy-6-isopropoxy-7-dimethylamino-quinoline-3-carboxylic acid in 20 ml. of absolute ethanol is added 1.5 ml. of concentrated sulfuric acid. The resulting solution is heated on the steam bath for 20 hours. Most of the ethanol is removed by evaporation in vacuo. The residue is cooled and neutralized with 10% sodium carbonate. The precipitate is separated and crystallized from a 1:1 ethanol-water mixture.

When the above process is carried out and 4-hydroxy-6-isopropoxy-7-diethylamino-quinoline-3-carboxylic acid, 4-hydroxy-6-isopropoxy - 7 - diphenylamino-quinoline-3-carboxylic acid, 4 - hydroxy-6-n-propyl-7-dibenzylamino-quinoline-3-carboxylic acid, 4-hydroxy-6-($\alpha,\alpha,\beta$-trifluoro-$\beta$-chloroethoxy)-7-morpholino-quinoline-3-carboxylic acid, 4 - hydroxy-6-n-butoxy-7-piperidino-quinoline-3-carboxylic acid, or 4-hydroxy-6-isopropoxy-7-diallylamino-quinoline-3-carboxylic acid is used in place of 4-hydroxy-6-isopropoxy-7-dimethylamino-quinoline - 3 - carboxylic acid, there is obtained ethyl 4-hydroxy-6-isopropoxy-7-diethylamino-quinoline-3-carboxylate, ethyl 4-hydroxy-6-isopropoxy-7-diphenylamino-quinoline-3-carboxylate, ethyl 4-hydroxy - 6-n-propyl-7-dibenzylamino-quinoline-3-carboxylate, ethyl 4-hydroxy-6-($\alpha,\alpha,\beta$-trifluoro-$\beta$-chloroethoxy)-7-morpholino-quinoline-3-carboxylate, ethyl 4-hydroxy-6-n-butoxy-7-piperidino-quinoline-3-carboxylate or ethyl 4-hydroxy-6-isopropoxy - 7 - diallylamino-quinoline-3-carboxylate, respectively.

When the above process is carried out and isopropanol is used in place of ethanol, there is obtained isopropyl 4-hydroxy-6-isopropoxy - 7 - dimethylamino-quinoline-3-carboxylate.

EXAMPLE 5

Ethyl 4-hydroxy-6-isopropoxy-7-diethylamino-quinoline-3-carboxylate 2 g. of 4-hydroxy-6-isopropoxy-7-diethylamino-quinoline-3-carboxylic acid is refluxed in benzene with a molar equivalent of thionyl chloride for 8 hours. The resulting acid chloride in 40 ml. of ethanol is heated on a steam bath at reflux for 5 hours. The reaction mixture is filtered while still hot and the filtrate is allowed to cool. The solid which separates is filtered, washed with water, and recrystallized from dimethyl formamide to give ethyl 4-hydroxy-6-isopropoxy - 7 - diethylamino-quinoline-3-carboxylate.

When the above process is carried out and n-propanol is used in place of ethanol, there is obtained n-propyl 4-hydroxy-6-isopropoxy - 7 - diethylamino-quinoline-3-carboxylate.

When the above process is carried out and 4-hydroxy-6-isopropoxy-7-diethylamino-quinoline-3-carboxylic acid, 4 - hydroxy-6-isopropoxy - 7 - diphenylamino-quinoline-3-carboxylic acid, 4 - hydroxy-6-n-propyl-7-dibenzylamino-quinoline-3-carboxylic acid, 4-hydroxy-6-($\alpha,\alpha,\beta$-trifluoro-$\beta$ - chloroethoxy)-7-morpholino-quinoline - 3 - carboxylic acid, 4 - hydroxy-6-n-butoxy-7-piperidino-quinoline-3-carboxylic acid, or 4-hydroxy - 6 - isopropoxy-7-diallylamino-quinoline-3-carboxylic acid is used in place of 4-hydroxy-6-isopropoxy-7-diethylamino-quinoline-3-carboxylic acid, there is obtained ethyl 4-hydroxy-6-isopropoxy-7-diethylamino-quinoline - 3 - carboxylate, ethyl 4-hydroxy-6-isopropoxy-7-diphenylamino-quinoline-3-carboxylate, ethyl 4-hydroxy-6-n-propyl - 7 - dibenzylamino-quinoline-3-carboxylate, ethyl 4-hydroxy-6-($\alpha,\alpha,\beta$-trifluoro-$\beta$-chloroethoxy)-7-morpholino-quinoline - 3 - carboxylate, ethyl 4-hydroxy-6-n-butoxy-7-piperidino-quinoline-3-carboxylate or ethyl 4-hydroxy-6-isopropoxy-7-diallylamino-quinoline-3-carboxylate, respectively.

EXAMPLE 6

One mole of o-diethylaminophenol in dimethyl formamide is admixed with sodium hydride (1 mol.). To the resulting solution is slowly added n-propyl bromide (1 mol.). The resulting mixture is then heated on a steam bath for 2 hours, added to water, and the entire mixture is extracted with ethyl ether. The ether is extracted with sodium hydroxide (2.5 N) and the ether solution evaporated to provide o-n-propoxy-N,N-diethyl aniline.

This product is treated with 20 ml. of concentrated sulfuric acid at 0° C. and 5 ml. of fuming nitric acid. The mixture is poured onto ice and neutralized with sodium carbonate to obtain 3 - diethylamino-4-n-propoxy nitrobenzene. This compound is added to 40 ml. of methanol containing 1 g. of 5% palladium-on-carbon and hydrogen is passed through the mixture. The catalyst is filtered off and the resulting solution concentrated to provide 3-diethylamino-4-n-propoxy aniline.

When o-diallylaminophenol, o-diphenylaminophenol, o-morpholinophenol, or o-dibenzylaminophenol is used in place of o-diethylaminophenol or isobutyl bromide is used in place of n-propyl bromide, there is obtained 3-diallylamino - 4 - n - propoxy aniline, 3-diphenylamino-4-n-propoxy aniline, 3-morpholino-4-n-propoxy aniline, 3-dibenzylamino-4-n-propoxy aniline or 3-diethylamino-4-isobutoxy aniline.

EXAMPLE 7

2.8 g. of o-nitrophenol in 100 ml. of dimethyl formamide containing 11 g. of sodium methoxide is alkylated with 3.0 g. of chlorotrifluoroethylene by heating in a sealed vessel at 100° C. for 5 hours. The mixture is poured into water, the product extracted with ether, and the ether washed with water and sodium hydroxide and water again. The product, o-($\alpha,\alpha,\beta$-trifluoro-$\beta$-chloroethoxy)-nitrobenzene, is obtained by evaporation.

This product is hydrogenated in 150 ml. of methanol using 1 g. of palladium-on-charcoal (5%) as catalyst. The resulting aniline is stirred and heated with 29 ml. of triethyl phosphate to 235–240° C. The temperature is then maintained at about 220° C. for 3 hours. The mixture is cooled and a solution of 22 g. of sodium hydroxide in 100 ml. water is added and the resulting mixture heated under reflux for about 2 hours. The mixture is diluted with about 200 ml. of water and extracted with ether several times. The combined ether solution is washed with water, dried, the ether removed and the product is distilled at 1 mm. at 80–90° C.

In a flask equipped for stirring is placed 50 ml. of concentrated sulfuric acid. It is cooled to −10° C. while 17 g. of the above compound is added. This solution is kept at −10° C. while a mixture of 22 ml. concentrated sulfuric acid and 5 ml. of concentrated nitric acid is slowly added. The mixture is kept at −10° C. for about one half hour, then allowed to warm to 0° C., poured into water and neutralized with sodium carbonate. The product is extracted into ether which is washed, and dried. The ether is evaporated and the product distilled off at 1.0 mm. pressure at 135–140° C. this product, 3-diethylamino-4-($\alpha,\alpha,\beta$-trifluoro-$\beta$-chloroethoxy) - nitrobenzene, is hydrogenated as before to provide 3-diethylamino-4-($\alpha,\alpha,\beta$-trifluoro-$\beta$-chloroethoxy)-aniline. When the above process is carried out and the appropriate loweralkene-1 or haloloweralkene-1 is used in place of triethylphosphate, corresponding disubstituted aniline starting materials for this invention are prepared.

EXAMPLE 8

Methyl 4-hydroxy-6-diethylamino-7-decyloxy-quinoline-3-carboxylate m-Acetamidophenol (45.4 g., 0.3 mole) is dissolved in 200 ml. of dimethyl formamide and sodium methoxide (16.2 g., 0.3 mole) is added. The reaction mixture is stirred, and 1-bromodecane (66.4 g., 0.3 mole) is then added. The reaction mixture is heated at 90–100° C. for 24 hours with stirring, and then poured into ice-water. The light pink solid which separates is collected and dissolved in ether. It is then washed with water, 10% sodium hydroxide and satuarted sodium chloride solution, and dried over magnesium sulfate. After filtering, the ether solution is evaporated under reduced pressure at 60° C. to give 43.3 g. of a light pink liquid which crystallizes from aqueous methanol. After recrystallization from methanol, 28 g. m-decyloxyacetanilide is obtained as white needles, M.P. 62–63° C.

m-Decyloxyacetanilide (26 g.) is suspended in 200 ml. of acetic anhydride. A solution of 10 g. of fuming nitric acid (sp. gr. 1.5) in 50 ml. of acetic anhydride is added slowly drop by drop with vigorous stirring, the temperature being kept below 0° C. The resulting dark green solution is stirred for another hour at 0° C., poured into ice, and kept overnight. The oil which separates changes into a yellow-brown crystalline solid. The crude product is extracted with 2 portions of boiling petroleum ether and 2 portions of boiling n-hexane. Concentration of the extract yields 13.2 g. (44%) of the almost pure 1-decyloxy-3-acetylamido-4-nitrobenzene which, after crystallization from aqueous methanol, forms light yellow crystals, M.P. 81–82° C. The material which did not dissolve in the petroleum ether and hexane was dissolved in chloroform, treated with charcoal, and crystallized by the addition of petroleum ether. The yield is 4.1 g. (14%) of the desired 1 - decyloxy - 3 - acetamido-6 - nitrobenzene as orange-pink crystals, M.P. 70–71° C.

1 - decyloxy - 3 - acetamido - 6 - nitrobenzene (4 g., 0.012 mole) is disolved in 100 ml. of methanol and 4.4 g. of cooled acetaldehyde is added. The mixture is hydrogenated at room temperature at 40 lbs. per sq. inch hydrogen pressure, using a 5% carbon-palladium catalyst. After absorption of 11 lbs. out of 13.5 lbs. theoretical, the catalyst is removed and the filtrate evaporated under reduced pressure to give 4.4 g. of a heavy oil which is the 3-decyloxy-4-diethylaminoacetanilide.

The above product (4.4 g.) in 20 ml. of 6 N HCl and 20 ml. of ethanol is heated to reflux for 16 hours. After cooling, the ethanol is removed under reduced pressure and the residue poured into ice-cold concentrated sodium hydroxide solution. The dark oil which separates is extracted with chloroform, washed with saturated sodium chloride solution, and dried over magnesium sulfate. The chloroform is then evaporated under reduced pressure to give 1.6 g. of a dark oil which is 3-decyloxy-4-diethylaminoaniline.

The above product (1.6 g., 0.005 mole) and 1 g. of dimethylmethoxy methylene malonate (0.005 mole) are heated on the steam-bath for 2 hours and concentrated. The anil is used in the next step without purification.

The anil is added, with stirring, to pre-heated dodecyl benzene (100 ml.) at 245° C. in a nitrogen atmosphere and the temperature kept at 245–250° C. for 15 minutes before cooling to room temperature. The reaction mixture is filtered and the solid is washed with N-hexane and then twice with acetone; and then dried to yield 408 mg. of methyl 4-hydroxy-6-diethylamino-7-decyloxy-quinoline-3-carboxylate, M.P. 204–207° C.

EXAMPLE 9

Methyl 4-hydroxy-6-diethylamino-7-octadecyl-quinoline-3-carboxylate m-Acetoxyacetanilide (108 g., 0.56 mole) is added in small portions to 216 ml. of concentrated nitric acid (sp. gr. 1.14, ice-cooled to 10° C.). To the solution thus obtained, there is then added ½ the volume (108 ml.) of fuming nitric acid (sp. gr. 1.5), and after stirring for 3 hrs. in an ice-bath at about 10° C., the solution is poured into ice. A crystalline deposit soon separates, and is removed by filtration. The mother liquor on standing for a few days yields a second crop of crystals. The second crystalline product is filtered, washed with water, and dried. The yield of 6-nitro-3-acetamidophenol is 43.5 g. (40%).

6-nitro-3-acetamidophenol (9.8 g., 0.05 mole) is dissolved in 100 ml. of dimethylformamide and sodium methoxide (2.7 g., 0.05 mole) is added. The reaction mixture is stirred and 1 bromooctadecane (17 g., 0.05 mole) is then added. The mixture is heated at 90–100° C. for 24 hours. The reaction mixture is poured into ice-water. The solid which separates is filtered, washed with water, and extracted with ether. The ether solution is washed with 10% sodium hydroxide and saturated sodium chloride and dried over magnesium sulfate. The ether is then removed under reduced pressure to give 8.9 g. of 4-nitro-3-octadecyloxyacetanilide as a light tan solid, which is recrystallized from methanol, M.P. 72–75° C.

The above product (8.5 g., 0.02 mole) is dissolved in 300 ml. of methanol. Cold acetaldehyde (8.8 g., 0.2 mole) is added and the mixture is hydrogenated at room temperature, using 40 lbs. per sq. inch pressure and 2 g. of 5% carbon-palladium catalyst. The catalyst is filtered off and the filtrate evaporated under reduced pressure to give 5.4 g. of 4-diethylamino-3-octadecyloxyacetanilide.

The above compound (5.4 g., 0.011 mole) in 200 ml. of 6 N HCl and 20 ml. of ethanol are heated under reflux for 17 hours. The reaction mixture is concentrated in order to remove the ethanol, and then poured into ice-cold sodium hydroxide. The solid which separates is collected, dissolved in ether, washed with water, and dried over magnesium sulfate. The ether is then removed under reduced pressure to give 3.2 g. of 4-diethylamino-3-octadecyloxyaniline as an oil which solidifies on cooling.

The above amine (3.2 g., 0.008 mole) and dimethylmethoxy methylene malonate (1.74 g., 0.01 mole) are heated on the steam-bath for 1½ hours and then concentrated to give the anil. This compound is then added to pre-heated dodecyl benzene (150 ml.) at 245° C. and kept at a temperature of 245–250° C. for 15 minutes under a nitrogen atmosphere with vigorous stirring. The reaction mixture is cooled to room temperature with stirring. It is then diluted with petroleum ether and filtered to yield 130 mg. of methyl 4-hydroxy-6-diethylamino-7-octadecyloxy-quinoline-3-carboxylate, M.P. 168–172° C.

EXAMPLE 10

Methyl 6-decyloxy-7-diethylamino-4-hydroxy-quinoline-3-carboxylate 2-nitrophenol (27 g.) is alkylated with 45 g. of 1-bromodecane in 400 ml. of dimethylformamide in the presence of 10.8 g. of sodium methoxide at 90–100° C. for 17 hours. It is purified by adding to water, extracting with hexane, washing with hexane solution, and evaporating to obtain 2-decyloxynitrobenzene.

The above compound (11 g.) is reductively alkylated by hydrogenating in 100 ml. of methanol and 8.8 g. of acetaldehyde in the presence of 2 g. of palladium-on-charcoal. After removing the catalyst, the product is distilled at 0.1 mm. pressure at 133–135° C., yielding 7 g. of 2-decyloxy-N,N-diethylaniline.

The above compound (7 g.) is added to 20 ml. of sulfuric acid at 0–8° C. The temperature is then reduced to −15° C. while a mixture of 3 ml. of concentrated nitric acid and 9 ml. of sulfuric acid are added slowly. After the addition, the temperature is allowed to rise to 0° C. and then poured into ice. After neutralizing, the resulting oil is extracted with chloroform. The solution is then washed with water, dried and evaporated to give 2-decyloxy-5-nitro-N,N-diethylaniline.

The above nitro compound (3 g.) is hydrogenated in 50 ml. of methanol in the presence of 1 g. of palladium-on-charcoal. After removing the catalyst, the resulting amine, 3-N,N-diethylamine-4-decyloxyaniline, is used in the next step.

The above amine (2.2 g.) is heated for 1 hour on the steam-bath with 2.2 g. of dimethylmethoxy methylene malonate in 20 ml. of absolute alcohol. The alcohol is removed and the residue added to 160 ml. of dodecylbenzene at 245° C. After 15 minutes, the mixture is cooled and the solid product separates. After washing with acetone there is obtained 1.1 g. of methyl 4-hydroxy-6-decyloxy - 7 - diethylamino-quinoline-3-carboxylate, M.P. 178–182° C.

EXAMPLE 11

Ethyl 6-decyl-7-diethylamino-4-hydroxy-quinoline-3-carboxylate

Into a cooled one liter three necked flask is placed 200 ml. of concentrated sulfuric acid and 107 ml. of concentrated nitric acid. The mixture is cooled to 20° C. while 83 grams of 1-phenyldecane is added slowly with vigorous stirring, the temperature being maintained at 20–25° C. After two hours, the solution is added to ice and this mixture extracted with benzene. The combined benzene solution is washed and dried and the benzene removed in vacuo to leave the product, 2,4-dinitro-1-phenyldecane.

The 4-nitro group is reduced to an amine by the use of ammonium sulfide. The ammonium sulfide is prepared by saturating a mixture of 40 ml. of ethanol and 40 ml. of ammonium hydroxide with hydrogen sulfide. This is then diluted with another solution of 40 ml. of ethanol and 40 ml. of ammonium hydroxide. To this stirred solution is added 40 g. of the dinitro phenyldecane in 90 ml. of ethanol. This mixture is stirred vigorously and heated under reflux for 40 minutes. The sulfur is rapidly filtered from the hot solution and 300 ml. of water added to the filtrate. The 3-nitro-4-decylaniline separated, yield 28 g., M.P. 48° C. It can be crystallized from hexane, M.P. 55–56° C.

28 grams of the above aniline is acetylated by the addition of 30 ml. of acetic anhydride and the solution heated on the steam bath for one hour. The solution is poured into 300 ml. of water and stirred to hydrolyze the excess acetic anhydride. The solid is then separated by filtration, dissolved in 45 ml. of warm benzene, washed and dried. To this benzene solution is added 450 ml. of hexane. The 3-nitro-4-decylacetanilide crystallized, yield 24 g., M.P. 66–67° C.

A solution of 16 g. of the above acetanilide in 150 ml. of methanol is hydrogenated in the presence of 8.4 ml. of acetaldehyde and 3 g. of 5% palladium-on-charcoal. A second batch of 3 g. of palladium is added to bring the hydrogen absorption up to the theoretical amount. The catalyst is removed by filtration and the solvent removed in vacuo. The residue is refluxed with 100 ml. of 6 N hydrochloric acid for one hour, cooled and the acid neutralized with sodium hydroxide. The 3-diethylamino-4-decylaniline is extracted with ether which is dried and evaporated to give 13 g. of product.

To 6 g. of the aniline is added 4.6 g. of diethylethoxy methylene malonate. This solution is warmed on the steam bath for 5 minutes and allowed to stand at room temperature overnight. This material is added to 100 ml. of dodecyl benzene heated to 250° C., and agitated by a strong current of nitrogen. After 15 minutes the solution is allowed to cool to room temperature. The result is a gel. The gel is filtered and the solid material purified by stirring with acetone and crystallizing from ethanol. To get an analytically pure sample, the material is sublimed at 195° C. at 0.4 mm. It then melts at 149–150° C.

EXAMPLE 12

Methyl 6-decyl-7-diethylamino-4-hydroxy-quinoline-3-carboxylate

The same procedure for the preparation of the ethyl ester is followed except that dimethylmethoxy methylene malonate is used instead of the diethyl ester in the reaction with 3-diethylamino-4-decylaniline. The product, methyl 6-decyl - 7 - diethylamino-4-hydroxy-quinoline-3-carboxylate is recovered as a gel with an indefinite melting point around 140° C.

EXAMPLE 13

Methyl 4-hydroxy-6-cyclohexyl-7-diethylamino-quinoline-3-carboxylate

The same general procedure used with 1-phenyldecane is followed subsituting phenylcyclohexane. It is dinitrated with fuming nitric acid, the 4-nitro group reduced with ammonium sulfide, the resulting aniline acetylated and the nitro group reductively alkylated, and the acetyl group removed to give 3-diethylamino-4-cyclohexylaniline. This is reacted with dimethylmethoxy methylene malonate and then heated to ring close to form the desired product. It is crystallized from dimethylformamide and melted at 268–270° C.

What is claimed is:
1. A compound of the formula:

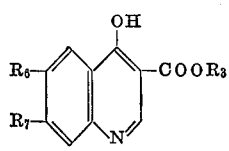

where $R_3$ is loweralkyl; $R_6$ is alkyl having 5–18 carbon atoms, alkoxy having 2–18 carbon atoms, or halolower-alkoxy; and $R_7$ is $NR_1R_2$ where $R_1$ and $R_2$ are loweralkyl, phenyl, benzyl or loweralkenyl.

2. A compound according to claim 1 where $R_6$ is $\alpha,\alpha,\beta$-trifluoro-$\beta$-chloroethoxy; and $R_7$ is diethylamino.

3. A compound according to claim 2 where $R_3$ is methyl.

4. A compound according to claim 1 where $R_6$ is $\alpha,\alpha,\beta$-trifluoro-$\beta$-chloroethoxy; and $R_7$ is dimethylamino.

5. A compound according to claim 4 where $R_3$ is methyl.

6. A compound according to claim 1 where $R_6$ is decyl.

7. A compound according to claim 6 where $R_3$ is methyl.

8. A compound according to claim 6 where $R_3$ is ethyl.

9. A compound having the formula

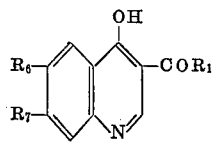

where $R_1$ is hydroxy or halo; $R_6$ is alkyl having 5–18 carbon atoms, alkoxy having 2–18 carbon atoms, or halo-loweralkoxy, and $R_7$ is $NR_1R_2$ where $R_1$ and $R_2$ are loweralkyl, phenyl, benzyl, or loweralkenyl.

References Cited
UNITED STATES PATENTS

| | | | |
|---|---|---|---|
| 2,614,121 | 10/1952 | Price | 260—287 X |
| 3,316,147 | 4/1967 | Watson | 167—53.1 |
| 3,377,352 | 4/1968 | Clark et al. | 260—286 |
| 3,399,202 | 10/1968 | Patchett et al. | 260—287 |
| 3,449,403 | 10/1969 | Patchett et al. | 260—471 |
| 3,414,576 | 12/1968 | Cairns et al. | 260—287 |

DONALD G. DAUS, Primary Examiner

U.S. Cl. X.R.

260—241.2, 294.7, 326,85, 471; 424—258